E. F. W. ALEXANDERSON.
ELECTRICAL SYSTEM OF POWER TRANSMISSION.
APPLICATION FILED MAR. 11, 1916.
1,304,239. Patented May 20, 1919.
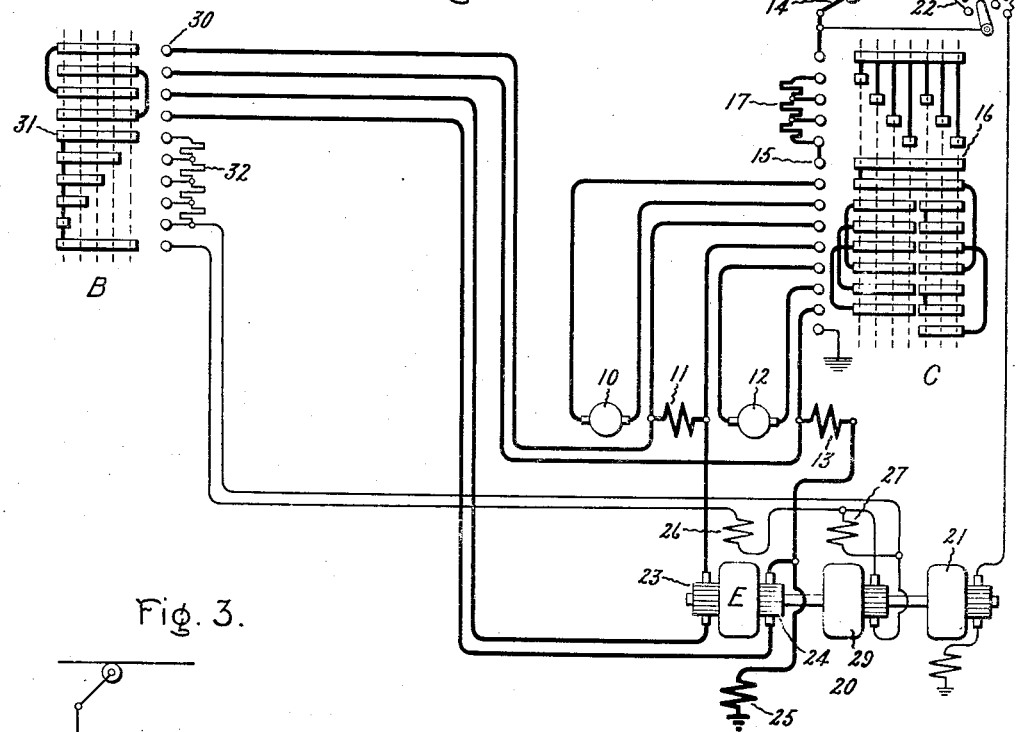
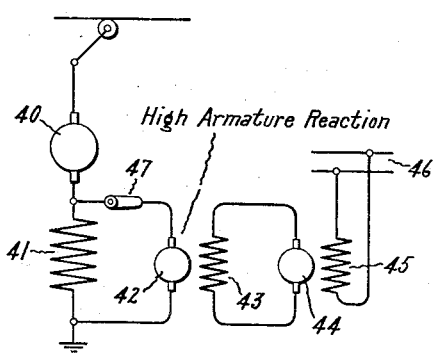
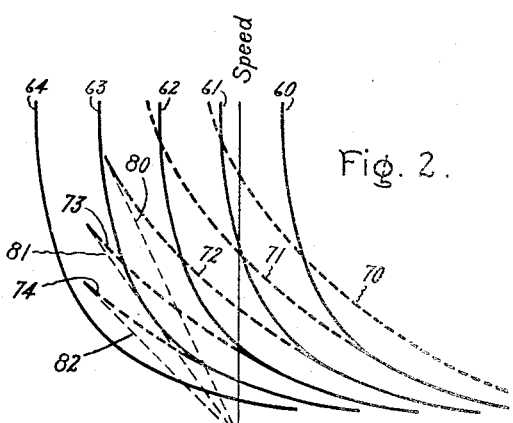
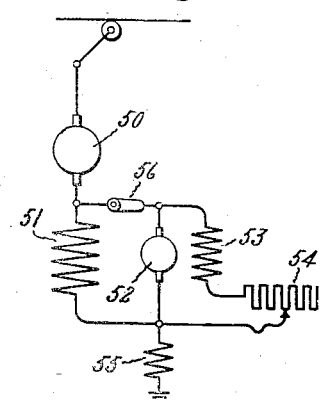
Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION.

1,304,239.  Specification of Letters Patent.  Patented May 20, 1919.

Application filed March 11, 1916. Serial No. 83,659.

*To all whom it may concern:*

Be it known that I, ERNST F. W. ALEXANDERSON, a citizen of the United States, residing at Schenectady, in the county of Schenectady, State of New York, have invented certain new and useful Improvements in Electrical Systems of Power Transmission, of which the following is a specification.

My invention relates to electrical systems of power transmission and particularly to systems of regenerative control comprising a dynamo-electric machine and a source of current adapted to be connected to a field winding thereof.

The possibilities of electric braking, in view of the obvious convertibility of a dynamo-electric machine from motoring to generating, have long been realized and, in the case of alternating current systems, electric braking has been extensively practised. With direct current transmission systems, electric braking can also be practised in a simple manner so long as the rating of the traction units is such that the energy generated can be consumed in rheostats carried on the units, but when the rating of the units is increased, the weight of these rheostats becomes prohibitive. Regenerative braking has, therefore, been proposed whereby the energy generated during electric braking is returned to the power circuit. Those who considered this problem were immediately confronted, on the one hand, by the fact that, in direct current work, a series dynamo-electric machine when operating as a motor has such desirable operating characteristics that it has become standard in traction service and, on the other hand, by the fact that a series dynamo-electric machine when operating as a generator is unstable and cannot be satisfactorily operated on a variable voltage system. A shunt dynamo-electric machine, although stable when operating as a generator, is unsuitable for traction purposes since it has a field which is sluggish to sudden changes during control, it tends to generate excessive voltages in the event of the trolley leaving the wire when the traction unit with which it is associated is descending an incline, has operating characteristics generally unsuited for fluctuating load conditions and tends to cause an unequal distribution of the load when employed in parallel operation.

It has heretofore been proposed, in the patent to Lang, No. 1,025,877, to use series dynamo-electric machines operating as series motors for propulsion and to provide an auxiliary source of excitation for the field windings of the series dynamo-electric machines when it is desired that they shall operate as generators for braking. By properly controlling the current supplied to the field windings of the dynamo-electric machines from this source, the excitation of the series field winding may be made to vary in the proper manner and the operation of the dynamo-electric machines made stable during the generating operation thereof. In my Patents No. 940,112 and No. 996,390, I have shown how a source of excitation, which as there shown is a dynamo-electric exciter, may be connected either in shunt or in series with the field winding of a dynamo-electric machine and it will be seen that the essential feature is that the source of excitation and the field of the dynamo-electric machine be connected together in a local circuit. In the system of Patent No. 940,112 the current generated by the dynamo-electric machine traverses the armature of the exciter while in the system of Patent No. 996,390 the current generated by the dynamo-electric machine does not pass through the armature of the dynamo-electric exciter. In the system of neither patent does the current generated by the dynamo-electric machine pass through the field thereof and in both systems the connections between the armature and series field winding of the dynamo-electric machine remain unchanged in the transfer from motoring to braking operation. In transferring from motoring to braking operation, the current in the armature of the dynamo-electric machine is reversed while the current in the field winding of the dynamo-electric machine remains unchanged due to the operation of the exciter or auxiliary source which is adapted during the generator operation of the dynamo-electric machine to furnish the exciting current for the field winding thereon.

With respect to motoring operation it is generally appreciated that a shunt dynamo-electric machine is not suitable for electric traction service on a system in which the voltage of the power circuit fluctuates and in which the profile is irregular because of its constant speed characteristic. On the other hand, it is well known that a series dynamo-electric machine has a variable speed torque characteristic which peculiarly adapts it for such conditions.

For the most satisfactory operation during braking the dynamo-electric machine should have speed current characteristics during generating of the same general type as the speed current characteristics during motoring. If the speed current characteristics during generating be sufficiently similar and approximately parallel to the speed current characteristics during motoring, not only does a certain variation in speed cause, during generating, a variation in armature current about equal in amount, but opposite in sign, to the variation in armature current which occurs, during motoring, with the same variation in speed but such speed current characteristics correspond to motoring and braking torque characteristics such that the dyanomo-electric machine may be caused to pass from motoring to generating, or vice versa, with objectionable shock or electrical disturbances and furthermore, correspond to such a regulation of current in the armature that it tends to approach limiting values when the speed of the dynamo-electric machine increases or the voltage of the supply circuit decreases. If the dynamo-electric machines have, during braking, speed current characteristics of the kind indicated, approximately the same relations exist between variations in speed, current and voltage during braking that exist during motoring.

One of the objects of my invention, is, then, to provide a regenerative braking system involving a novel method of operation such that the relations between variations in speed, current, and voltage which are characteristic of a series machine running as a motor shall be approximately maintained. More specifically, it is an object of my invention to provide a system wherein a series of dynamo-electric machine may be operated either as a series motor or as a generator to return energy to the power circuit and the relations between speed, current and voltage, characteristic of its operation as a series motor, be approximately maintained. I have discovered that this object of my invention may be attained if, in a system of the kind to which my invention relates, the dynamo-electric machine be caused to have speed current characteristics during generating approximately like its speed current characteristics during motoring. I have also discovered that if the sum of the currents in the armature and field winding of the dynamo-electric machine be maintained approximately constant during the generating operation thereof the speed current characteristics during generating will be approximately like the speed current characteristic during motoring. Although the speed current characteristics during generating will be more nearly like the speed current characteristics during motoring, if the sum of said currents be maintained substantially constant nevertheless the speed current characteristics during generating and motoring will be approximately alike although the sum of the currents be maintained only approximately constant. In accordance with my invention I propose to excite the series field winding of the dynamo-electric machine from independent means and to maintain the sum of the currents in the armature and field windings approximately constant. In a system in which an independent exciter is connected in a local circuit with the series field winding of the dynamo-electric machine this may be accomplished by designing and arranging the exciter to have a characteristic which droops to the proper degree as the current in the armature of the dynamo-electric machine increases. If the exciter be connected in shunt to the field winding the current in the exciter armature should be maintained approximately constant while if the exciter be connected in series with the field winding the current in the shunt around the exciter armature and the field winding should be maintained approximately constant.

Now, it will be readily evident to one skilled in the art, that if the dynamo-electric machine with superimposed excitation as used for regenerative braking has a speed current characteristic which is essentially a shunt characteristic, or which differs very materially from the corresponding speed current characteristic of the dynamo-electric machine when operating as a series motor, then the transfer from one connection to the other will result in a severe shock to the apparatus, and a jerking of the train, unless it happens that the transfer is made when the train is running at exactly the speed at which the two characteristics intersect. Accordingly, another object of my invention is to device means and a method of operation whereby this transfer from motoring to braking connections and thence to braking operation may be made entirely gradual without such shock or other undesirable feature. I accordingly give the combined apparatus a speed current characteristic either identical with that of the dynamo-electric machine when operating as a series motor, or which does not differ substantially therefrom. More specifically, I find it desirable to so design the exciter that its voltage, prior to its connection across the field winding of the dynamo-electric machine, will be automatically maintained substantially equal to the drop in voltage thereacross, in order that there shall be no change in the flow of current in said field winding when the connection is made.

Another object of my invention is to provide improved means for controlling the generator operation of series dynamo-electric machines.

In carrying out my invention, I provide a source of independently controllable voltage, which may be connected in a local circuit with the field of the series machine. This source, which I shall hereinafter term an exciter, is provided with a field winding, or windings, so arranged and excited that a combined shunt and series characteristic is impressed on the exciter, to the end that this machine has a drooping characteristic. Although the shunt element of the excitation for the exciter may be obtained from the machine itself, I find it is desirable, in many instances, to provide still another machine, which I shall term a control generator. The series component of the excitation for the exciter will be so arranged as to be differential in action during braking. This differential series component may be readily supplied by means of a series field winding, though equivalent means will at once be evident to one skilled in the art. The degree of braking obtained may be regulated by means of a controller, one specific form of which will be hereinafter more fully described.

My invention will be more readily understood by reference to the accompanying drawing, in which:

Figure 1 is a diagrammatic view showing the motors and control apparatus of a traction unit, together with the connections between the same; Fig. 2 is a diagram showing the relation between the speed and the armature current of the dynamo-electric machines during motoring and braking; and Figs. 3 and 4 are diagrammatic views showing modified arrangements.

Referring to Fig. 1, wherein I have illustrated one arrangement of apparatus embodying my invention, I have shown a pair of dynamo-electric machines, which in view of their normal function will be generally referred to hereinafter as traction motors or simply motors, having armatures 10 and 12 and series field windings 11 and 13. Power is supplied to these motors from some convenient source, such, for example, as the trolley 14. For the purpose of controlling these motors and connecting them either in series or in parallel, there is provided a main controller C, which may be of any suitable form or arrangement, and is here illustrated as comprising fixed contacts 15, associated with which are moving contacts 16 which will ordinarily be mounted upon a rotating drum in the controller. Associated with the controller is a starting resistance 17. Movement of the drum of the controller carrying the contacts 16 will effect in regular sequence various connections whereby power will be supplied to the motors through the starting resistance 17, and they will be accelerated until they are finally connected either in series or in parallel, without the inclusion of any of the starting resistances. It should be here noted that the controller as illustrated keeps the field windings 11 and 13 upon the ground side of the armature. While this is not essential to my invention, it will be found preferable in cases where the trolley potential is considerable, in order to relieve the insulation strain upon the field windings.

For the purpose of utilizing the traction motors for regenerative braking, there is provided a motor generator set 20, which is driven by means of a motor 21 supplied with power from the trolley 14 through the starting resistance 22. Driven by this motor, and here shown as mounted on the same shaft, is a generator, which I shall for convenience term an exciter, E. This machine is illustrated as a double commutator machine provided with commutators 23 and 24, which are adapted to be connected in a local circuit with the field windings 11 and 13 of the traction motors. It will be understood that the armature circuits connected to the commutators 23 and 24 are electrically independent, and are simply mounted upon the same rotor for convenience. This exciter E is provided with a series field winding 25, the purpose of which will be later explained, and with a separately excited winding 26. Current for the excitation of the separately excited winding is supplied by means of the control generator 29, preferably forming a part of the same motor generator set 20.

In addition to the main controller C, I have provided a so-called braking controller B, which may be of a similar construction to the main controller, and comprises fixed contacts 30 and moving contacts 31, by means of which the exciter armature windings may be connected to the traction motor field windings, and the separately excited field windings of the exciter supplied with a current for excitation which may be adjusted, to alter the excitation of the traction motor fields, in any suitable manner, as, for example, by including more or less of the resistance 32 in circuit with said shunt field winding 26.

A locomotive to which the apparatus illustrated in Fig. 1 may have been applied can then be accelerated from standstill by manipulation of the main controller C, and can be operated, according to external conditions, with the motors connected either in series or in parallel. Although I have herein illustrated my invention as applied to two traction motors, it will be understood that it is in no wise so limited, and that the particular illustration employed is simply for convenience, in order to avoid complicating the drawing.

If, now, it is desired to begin braking operations, the motor generator set, if it is not already running, will be started by means of the rheostat 22, and the braking controller B will be moved to its first position, whereby the exciter armatures 23 and 24 are each connected in a local circuit with one of the field windings 11 and 13. As I have already pointed out, by reference to my previous Patents #940,112 and 996,390, it is not at all essential that the exciter shall be connected in shunt with the field windings, as herein shown, but it is only necessary that they be connected in a local circuit in any manner, as, for example, that shown in the latter patent.

It should be noted that the connection of the series field winding 25 of the exciter, is such that it carries the full current passing through the locomotive, and preferably this winding will be so designed that, without any excitation of the separately excited field winding of the exciter, the voltage developed at the exciter terminals will be practically equal to the voltage drop in the field windings 11 and 13. Inasmuch as the current through the winding 25 varies in a definite relation with the current through the windings 11 and 13, it will be seen that this condition may be readily fulfilled, regardless of the particular value of the current passing therethrough. As a result of this design of the field winding 25, no change in operation will occur when the braking controller is moved to its operating position, and no current will flow through the exciter armatures, it being understood that the resistance 32 is then designed to be of such a magnitude that the excitation supplied to the separately excited field winding 26 is negligible at this point. Evidently this is only one specific way of accomplishing the desired result, and it will be seen that satisfactory operation may be had if the arrangement is such that, prior to movement of the braking controller, the traction motors have one series characteristic, and after movement of the same to connect the exciter armatures in circuit with the motor field windings have the same or another series characteristic which is sufficiently in agreement with the first to make immediate transfer from one to the other permissible, without excessive changes in torque. Further rotation of the braking controller will result in short-circuiting portions of the resistance 32 so as to increase the excitation of the winding 26. This will cause a flow of current in the local circuit of the field windings of the traction motors and the exciter armatures, in addition to the normal flow of current through the field windings 11 and 13 which accompanies their operation as motors with the result that the excitation of the traction motor fields will be increased, and a tendency to reduce the speed of the locomotive produced. If, however, owing to external conditions of grade, the speed remains the same, then the current absorbed by the motors and hence the torque produced thereby will be lessened. Continuing the increase in the excitation of the separately excited field winding 26, a point will be reached where no current will flow from the trolley to the traction motors, and, consequently, no torque will be furnished to assist in pulling the train. A still further increase in the excitation of the separately excited field winding 26 will result in causing the traction motors to act as generators and deliver current to the distribution system. The series field winding 25 is so arranged and connected that, when this condition of affairs is attained, it produces a flux opposing that produced by the separately excited field winding. The current flowing through the locomotive will now be from ground through the series winding 25, and, supposing the traction motors are connected in series, through the exciter armature 24, the exciter armature 23, and the traction motor armatures 12 and 10, to trolley. In addition, there will be a flow of current in the local circuit of the exciter armature 24 and the field winding 13, such that the direction of current through the field winding 13 is the same as during normal motoring operations. A similar flow of current will be found in the local circuit, including the exciter armature 23 and the field winding 11.

The operation of the system will be more readily understood by reference to Fig. 2, where I have shown in full lines a series of curves 60 to 64, inclusive, the ordinates of which are taken to represent speeds of the traction motors, and the abscissæ of which represent the armature current therein. The curve 60 is a representation of the speed current characteristic of a standard series motor, and hence of the traction motors which I have employed, while the curves 61 to 64, inclusive, have been drawn parallel to the curve 60, and displaced therefrom toward the left by certain definite intervals.

I have previously intimated that the use of a differential series excitation for the machine E results in giving this machine a drooping characteristic, which further results in making the machine an approximately constant current machine. I now have found by a consideration of this particular problem, and have proven by means of tests, that the use of an approximately constant current exciter E in the connections shown results in giving the traction motors a speed current characteristic during braking which is essentially similar to their speed current characteristic during motoring. This means that if we hold the sum of the currents in the traction motor armature and field winding approximately constant, and in this instance the exciter armature current approximately constant, we shall be operating upon some characteristic, such as that shown at 63, corresponding to an exciter armature current of, say, 150 amperes. Similarly, the curves 61, 62 and 64 correspond to exciter armature currents of 50, 100 and 200 amperes, respectively. Thus in motor operation the change from 25 to 30 miles per hour may cause a change in current from 30 to 25 amperes, or a negative increment of 5 amperes. If, on the other hand, the motor were regenerating 30 amperes at 25 miles per hour, that is, delivering a negative current, and the speed changes to 30 miles per hour, then the negative increment to the negative current gives a result of —35 amperes, which is the corresponding current for a similar motoring characteristic.

These relations, as analyzed graphically in Fig. 2, mean that the regenerative characteristic is a curve parallel to the motor characteristic, though displaced a certain distance to the negative side of the speed axis. The diagram shows a number of these regenerative characteristics displaced more or less from the motor characteristic, but each conforms to the rule that the algebraic speed ampere increments are the same as at the same speed of the motor characteristic.

Further, this diagram shows a series of curves drawn for some particular voltage. However, inasmuch as the electromotive force developed by the motor whether motoring or generating is proportional to the speed, it is evident that the characteristics for any other voltage can be obtained from those shown by increasing the ordinate by an amount proportional to the increase of voltage. The distance between equal ordinates on the characteristic curves corresponding to the two voltages represents the change in current which will result from sudden fluctuations in voltage at the speed corresponding to said ordinates. Thus, it is apparent that the current fluctuations due to voltage fluctuations when braking are the same as when motoring.

Although I have pointed out above that it is the exciter armature current which should be maintained approximately constant in order to secure these desirable results with the particular shunt connections of the exciter and traction motor field, it will be seen upon analysis that if the sum of the currents flowing in the armature and field winding of the traction motor be maintained approximately constant, then the same result will be secured with any other equivalent local circuit connection of exciter and traction motor field.

I have previously stated that the essential feature for a smooth change over from motoring to braking connections is that the characteristic of the motor with superimposed excitation shall be substantially the same as that of the motor alone. This does not mean, however, that the characteristics under the different operating conditions must be alike but only that they must be sufficiently alike so that the transfer from the normal speed current characteristic during motoring to the characteristic with superposed excitation may be made at any speed without an excessive change of torque. This will be accomplished if the two characteristics are not materially different in character and if they occupy such relative positions that the curve representing one characteristic intersects the other at a point corresponding to the average operating speed.

To illustrate this, I have shown, in Fig. 2, a series of dotted curves 70 to 74, inclusive, similar to the curves 60 to 64. These latter may be taken to represent the characteristic curves of this same traction motor with an exciter connected in a local circuit with its field winding, where this exciter has a less number of turns in its series winding than in the case already described. The slope or characteristic shape of these curves is determined by the design of the series field winding. Their position with reference to the base line, however, is determined by the amount of separate excitation given the exciter. Now, I have already pointed out that the curve 60 represents the speed current characteristic of the motor during motoring. If, then, it is desired to complete the connections between the auxiliary source and the field of the motor preparatory to braking, this connection may be made at any speed, within limits, without producing an excessive change in current or torque, if the operation after the connection is along a characteristic curve such as that shown at 70. This curve, as will be noted, is not substantially different from the characteristic 60, and intersects the same at a point corresponding approximately to the average operating speed. If the vehicle is running at this average speed at the time of transfer, then there will be no change whatsoever either in torque or in current. Furthermore, regardless of the speed, within limits, the change in connection may be made without producing an excessive change in torque or current, even though it be made at a speed which is considerably higher or lower than the average operating speed.

Since the position of the curve with reference to the base line is determined by the separate excitation, and since the design of the exciter now being used is such that its series field has a less number of turns, it will be necessary to supply some separate excitation at the time when the exciters are connected to the motor fields by movement of the braking controller to its first operating position. This may readily be effected by a proper design of the resistance 32, so that instead of making the separate excitation of the exciter negligible at the first braking position, it will have an appreciable value.

For some purposes, however, it may be desirable to reproduce the motor characteristic exactly, in which case I would use the arrangement already described, wherein the voltage of the exciters is automatically maintained equal to the drop in the motor field windings by means of a correct design of the series field winding 25.

Now, I have found that after the exciter is connected in shunt to the field windings of the traction motors, the result of increasing the separate excitation thereof is to cause a perfectly gradual transition from a condition of motoring to a condition of braking wherein the motors are acting as generators and delivering current to the trolley, and hence taking mechanical energy from the locomotive. This means that I have gradually transposed the speed current characteristic curve from one side to the other of the speed axis, so that at any given speed the tractive effort of the motors may be transformed into a braking torque by properly exciting the field winding 26. The characteristic shape of the curve, however, is not altered, provided the exciter armature current is maintained practically constant, and the amount of displacement from the motoring characteristic is directly determined by the degree of excitation produced by the winding 26. It will, therefore, be seen that I have provided an arrangement whereby the change from braking to motoring operation is entirely gradual, and unattended by any shocks or jerks of the train, so that at any particular speed the interconnection of the two machines may be made without thought on the part of the motorman, and with the assurance that no substantial change in operation will result. This results primarily from the fact that the motor with superimposed excitation has substantially the same characteristic as the motor alone, and more specifically from the face that the voltage of the exciter is automatically adjusted so that it equals the voltage drop across the traction motor field windings when the connection therebetween is closed, thus preventing any immediate change in the operation of the locomotive; and, furthermore, from the fact that the change-over from motoring to braking operation at any particular speed is caused by the increased excitation of the separately excited field winding 26. Inasmuch as this increase in excitation may be made just as gradual as desired by proper design of the resistance 32 and the braking controller, then it may be essentially continuous.

While the curves 60 to 64 may represent the most desirable operating characteristics from some standpoints, because they are the same as those of a standard series motor, still from another standpoint the series characteristics 70 to 74 may be more desirable, in spite of the fact that they tend slightly toward the pure shunt constant speed characteristic. It is evident that, for absolutely safe operation, the operating characteristic of the motor should be such that, at any position of the braking controller handle, an increase of speed will not give a decreased braking torque and so on cumulatively. Now, in Fig. 2, radiating lines drawn outward from the intersection of the axes of speed and current will represent the loci of constant torque with variable speed, and lines nearest the vertical will represent minimum torque, while those nearest the horizontal will represent maximum torque. Such lines are shown in the dash lines 80, 81 and 82, which may be taken as the loci for 2,000, 3,000 and 4,000 pounds braking torque. In order that the speed current curves shall represent perfectly stable operating characteristics, therefore, it will be seen that it is necessary that, with increasing speeds, they shall always cut loci of greater torque values. Evidently this is not the case with the curves 62, 63 and 64, but is true of the curves 71 to 74 within the useful operating range as indicated by the portions shown. Hence, such characteristics as those shown in curves 70 to 74 may in some instances be desirable. It will be noted, however, that these curves are not substantially different from the curves shown in full lines, which represent the characteristics of a series motor.

While I have illustrated in Fig. 1 one very desirable arrangement of the elements going to make up my system of control, it will be evident to one skilled in the art that this is not the only possible arrangement, and I have, accordingly, illustrated in Figs. 3 and 4, two other of the possible modifications which are designed to secure essentially similar results. Thus, in Fig. 3 a single traction motor having an armature 40 and a field winding 41 is provided with an exciter whose armature 42 is adapted to be connected in shunt to the field winding 41 by means of the switch 47. In this case the drooping characteristic of the exciter is effected by designing the machine with a relatively high armature reaction, and its shunt excitation is secured from the separately excited field winding 43, which is excited in turn from the control generator 44, having a field winding 45 which may be excited and controlled from the buses 46. These buses may extend throughout the train in the case of multiple unit operation. In Fig. 4, the traction motor 50 is provided with the field winding 51, and the exciter armature 52 is connected in shunt with said field winding 51 by means of a switch 56. This exciter is self-excited by means of a shunt field winding 53 arranged to be controlled by means of a resistance 54, and is also excited from the differential series winding 55, so located that it carries the current flowing through the armature 50 of the traction motor.

While I have herein shown and described several specific embodiments of my invention, it will be evident to those skilled in the art that there are many possible modifications thereof, and I, accordingly, wish it understood that I do not desire to be limited to any particular arrangement shown and described, but seek to cover in the appended claims all such modifications as come within the true scope and spirit of my invention.

What I claim as new and desire to secure by Letters Patent of the United States, is:—

1. In combination, a dynamo-electric machine having a series winding and adapted to be operated either as a motor or as a generator, a source of current connected in a local circuit with the field winding of said machine and adapted to be traversed during the generating operation of said dynamo-electric machine by the currents in the armature and the field winding thereof, and means for maintaining the sum of the currents in the armature and field windings of said machine approximately constant.

2. In combination, a series dynamo-electric machine, a source of electric current connected in a local circuit with the field winding of said machine, and means for maintaining the current flowing through said source approximately constant.

3. In combination, a series dynamo-electric machine, an auxiliary dynamo-electric machine connected in a local circuit with the field winding of said machine, and means for varying the excitation of said auxiliary machine to maintain the sum of the currents in the armature and field windings of said first-mentioned machine approximately constant.

4. In combination, a series dynamo-electric machine, an auxiliary dynamo-electric machine connected in a local circuit with the field winding of said machine, and a field winding on said auxiliary machine responsive to variations in the armature current of said first mentioned machine arranged to maintain the sum of the currents in the armature and the field windings of said first-mentioned machine approximately constant.

5. In combination, a dynamo-electric machine having a series field winding and adapted to operate either as a motor or as a generator, an exciter comprising an armature adapted to be connected to said series field winding and to be traversed, during the generating operation of said dynamo-electric machine, by the currents in the armature and field windings thereof and a field winding adapted to be traversed, during both the motoring and generating operation of said dynamo-electric machine, by the current in the armature thereof.

6. In combination, a series electric motor, an exciter, means for connecting said exciter in a local circuit with the field winding of said motor, and means for so varying the voltage of said exciter that the motor, with its superposed excitation, has a speed current characteristic which is not substantially different from the characteristic of the motor when operating with series excitation.

7. In combination, a dynamo-electric machine having a series field winding and adapted to operate either as a motor or as a generator and an exciter having a drooping characteristic for exciting said series field winding and causing said machine to have speed current characteristics during generating approximately like its speed current characteristics during motoring.

8. In combination, a dynamo-electric machine having a series field winding and adapted to operate either as a motor or as a generator and a source of current adapted to be connected to said series field winding and to be traversed by the currents in the armature and field windings of said machine during the generating operation thereof, said source of current being adapted to impress a voltage upon said field which is a function of the current traversing said armature.

9. In combination, a power circuit, a series motor connected thereto, an exciter, means for connecting said exciter in a local circuit with said series field winding of said motor, means for increasing the current supplied by said exciter to said field winding to cause said motor to act as a generator, and means for varying the voltage of said exciter during the generating operation of said motor to cause the motor with the superposed excitation to have a speed current characteristic during its generating operation which is not substantially different from its characteristic when operated as a motor with only series excitation.

10. In combination, a dynamo-electric machine having a series field winding and adapted to operate either as a motor or as a generator, a source of current adapted to be connected to said field winding and to be traversed by the currents in the armature and field winding of said machine during the generating operation thereof, and means responsive to the current traversing said armature during the generating operation for controlling the current supplied to said field winding by said source of current to cause said machine to have a speed current characteristic during its generating operation which is substantially the same in shape as its speed current characteristic during its motoring operation.

11. The method of controlling a direct current series motor to cause the same to return current to a main source of supply which consists in connecting in a local circuit with the field winding of said motor a secondary source of current supply which is adapted to be traversed by the current returned to the main source of supply, and in maintaining the sum of the currents in the armature and field windings of said motor approximately constant at a predetermined value.

12. The method of controlling a direct current series motor to cause the same to return current to a main source of supply, which consists in connecting in a local circuit with said field winding a secondary source of current which is adapted to be traversed by the current returned to the main source of supply, varying the current supplied by said secondary source to said field winding to vary the amount of current returned to said source of supply, and maintaining the sum of the currents in the armature and field windings of said motor approximately constant at a predetermined value.

13. The method of operating a direct current series motor connected to a source of supply, which consists in adjusting the voltage of a secondary source to equal the voltage drop across the field winding of the motor, connecting said secondary source in a local circuit with said field winding, increasing the current supplied by said source to decrease the speed of said motor and reverse the current through the armature thereof, and maintaining the sum of the currents in the armature and field windings of said motor approximately constant at a desired value.

14. The method of braking a direct current series motor connected to a source of supply, which consists in connecting a secondary source of supply in a local circuit with the field winding of said motor while maintaining the connection of the motor field and armature windings, and controlling the voltage of said secondary source by the motor armature current so that changes in the latter will produce corresponding changes in the motor field current.

15. The method of operating a direct current series motor connected to a source of supply to secure regenerative braking, which consists in maintaining the connections between said motor and its source of supply, adjusting the voltage of a secondary source to equal the voltage drop across the field winding of the motor and then connecting said secondary source in a local circuit with said field winding for the purpose of ultimately controlling the operation of the motor without causing any immediate change.

16. The method of transferring a series of dynamo-electric machine, connected to a power circuit, from motor operation to generator operation, which consists in causing the voltage of an auxiliary source of current to vary in such a way that it may be connected to the field winding of said dynamo-electric machine without substantially modifying the speed-current characteristic thereof, connecting said source to said field winding, and thereafter increasing the current supplied to said field winding from said auxiliary source to cause said machine to operate as a generator.

17. The method of transferring a series dynamo-electric machine from operation as a series motor to operation as a motor with superposed excitation, which consists in causing the voltage of an auxiliary source of current to vary in such a way that it may be connected to the field winding of said dynamo-electric machine without substantially modifying the speed current characteristic thereof, connecting said source to said field winding and thereafter varying the current supplied to said field winding from said auxiliary source whereby the transfer from motor operation without superposed excitation to motor operation with superposed excitation may be made at any speed without an excessive change in torque.

18. The method of transferring a series excited motor from operation with series excitation alone to operation with an exciter connected in local circuit with its field winding, which consists in causing the voltage of said exciter to vary in such a way that it may be connected to the field winding of said dynamo-electric machine without substantially modifying the speed current characteristic thereof and connecting said exciter to said field winding.

19. The method of operating a vehicle provided with a direct current series motor in conjunction with a drooping characteristic exciter to secure regenerative braking, which consists in maintaining the connections between said motor and its source of supply for operation with a series speed-current characteristic, interconnecting the motor and exciter without materially affecting the interchange of energy between the motor and its source of supply, then increasing the voltage of the exciter to cause the motor to act as a generator, and so controlling the voltage of said exciter that the operating characteristic of the motor for braking is not materially different from that obtained in motoring.

20. The method of controlling an electric motor having a field winding connected in series with its armature, to cause the same to return energy to a source of supply, which consists in connecting a source of current in a local circuit with said field winding, and in maintaining the sum of the currents in the armature and field winding of said motor approximately constant by varying the potential of said auxiliary source.

21. The method of controlling an electric motor having a field winding connected in series with its armature and connected to a source of supply, in order to cause the current flowing between said source and said motor to gradually decrease, and then reversing its direction to gradually increase, which consists in adjusting the potential of an auxiliary source so that it equals the potential drop across the field winding of said motor, connecting said auxiliary source in shunt to said field winding, gradually increasing the potential of said auxiliary source to the desired value, and then maintaining the current flowing through said source approximately constant.

In witness whereof, I have hereunto set my hand this 10th day of March, 1916.

ERNST F. W. ALEXANDERSON.